United States Patent [19]

Shinkai

[11] 3,980,813
[45] Sept. 14, 1976

[54] APERTURE CORRECTION CIRCUIT
[75] Inventor: Kinya Shinkai, Yokohama, Japan
[73] Assignee: Sony Corporation, Tokyo, Japan
[22] Filed: Dec. 9, 1974
[21] Appl. No.: 531,050

[30] Foreign Application Priority Data
 Dec. 17, 1973 Japan.............................. 48-141644

[52] U.S. Cl........................... 178/7.1; 178/DIG. 25;
 178/7.3 R
[51] Int. Cl.²......................................... H04N 5/14
[58] Field of Search........... 178/7.1 R, 7.3 R, 7.5 R,
 178/DIG. 25, DIG. 34, 7.2

[56] References Cited
UNITED STATES PATENTS
3,377,425    4/1968    Buzan........................ 178/DIG. 25
3,641,268    2/1972    Beck.......................... 178/DIG. 34

FOREIGN PATENTS OR APPLICATIONS
2,041,798    2/1972    Germany.................... 178/DIG. 25

Primary Examiner—John C. Martin
Attorney, Agent, or Firm—Lewis H. Eslinger; Alvin Sinderbrand

[57] ABSTRACT

An aperture correction circuit is disclosed in which the first portions of the differentiated signals of input video signals are inverted, and the waveform shaped signals thus obtained and the input video signals are added together whereby the corrected video signals having sharp edged waveforms are obtained.

6 Claims, 14 Drawing Figures

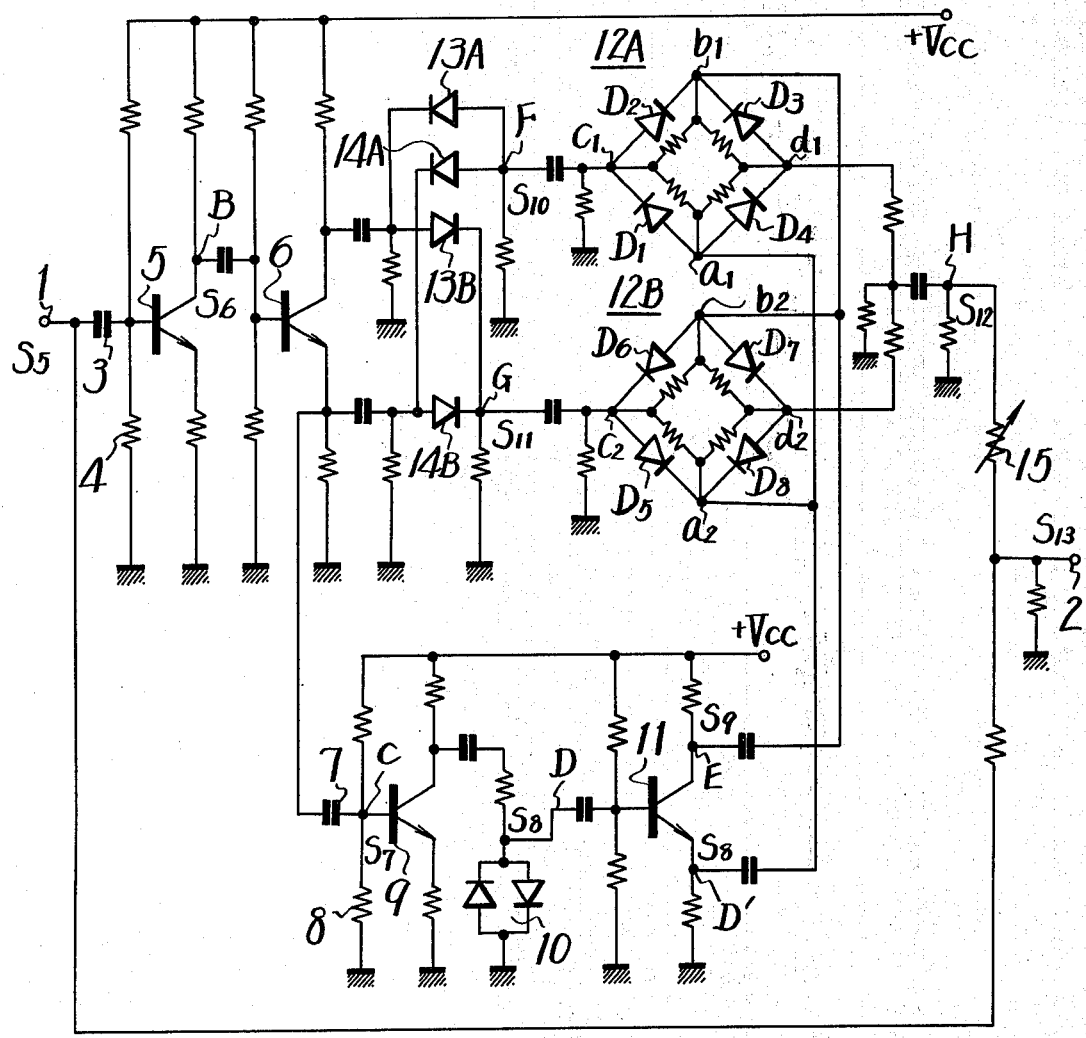

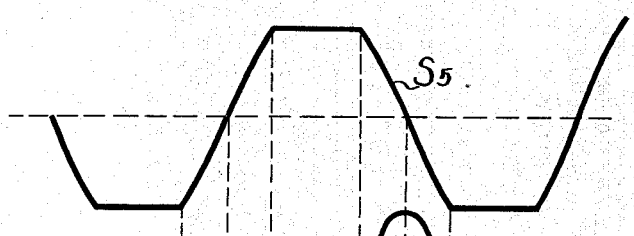
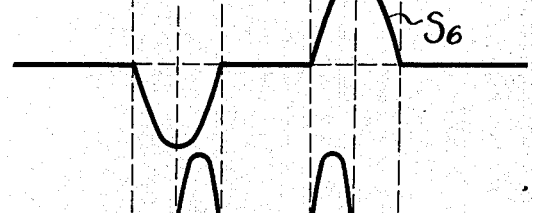
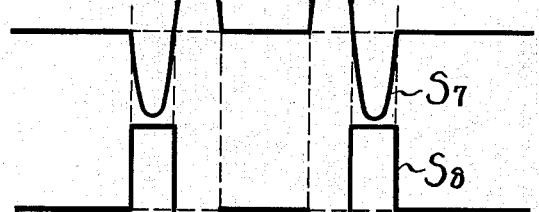
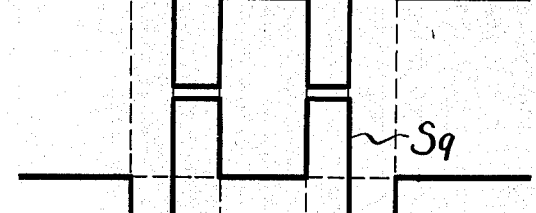
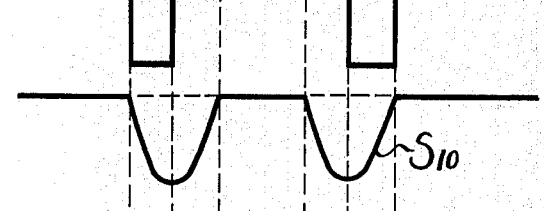
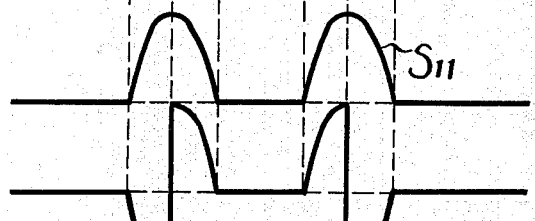
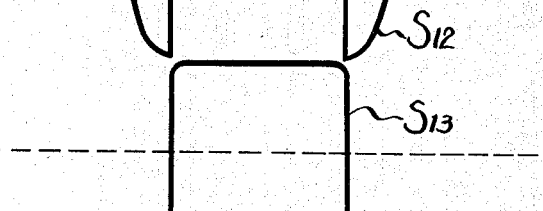

APERTURE CORRECTION CIRCUIT

BACKGROUND OF THE INVENTION

1. Field of the Invention

This invention relates generally to an aperture correction circuit, and more particularly to an aperture correction circuit by which ideal corrected video signals having sharp edged waveforms are obtained.

2. Description of the Prior Art

In television receivers or the like, the sharpness of a reproduced picture is limited by the frequency and phase response of the video channels of the receivers and by the size of the beam spot on its cathode ray tube.

In order to improve the picture sharpness, so-called aperture correction circuits are provided which are well known in the prior art.

Conventional aperture correction circuits of the prior art perform their operations by superimposing twice-differentiated signals of input video signals on the input video signals.

However, in actual television receivers and the like, the input video signals have relatively dull edged waveforms so that correcting signals having sharp waveforms can't be obtained just by differentiating the input video signals. That is, the input video signals can't be corrected sufficiently.

OBJECT OF THE INVENTION

Accordingly, it is an object of this invention to provide a novel aperture correction circuit avoiding the above-mentioned disadvantages inherent in the prior art.

It is another object of this invention to provide an improved aperture correction circuit for television receivers and the like.

It is a further object of this invention to provide a novel aperture correction circuit which can correct input video signals ideally even when the input signals have relatively dull edged waveforms.

SUMMARY OF THE INVENTION

The present invention provides a novel aperture correction circuit which can sharpen the edge portions of input video signals sufficiently. The aperture correction circuit according to this invention includes a differentiating circuit, a waveform shaping circuit and an adding circuit.

The input video signals, which are supplied to the aperture correction circuit from an appropriate video signal source, are supplied to the differentiating circuit and the adding circuit simultaneously.

The differentiated signals from the differentiating circuit are supplied to the waveform shaping circuit and first half portions of the differentiated signals are inverted by the waveform shaping circuit. The waveform shaped signals from the waveform shaping circuit are supplied to the adding circuit whereby aperture corrected signals are derived from the adding circuit.

BRIEF DESCRIPTION OF THE DRAWING

FIG. 1A to FIG. 1D, inclusive, show waveform diagrams used for explaining the principle of this invention;

FIG. 2 shows a circuit diagram illustrating an embodiment of the aperture correction circuit according to the present invention; and FIG. 3A to FIG. 3I, inclusive, show waveform diagrams used for explaining the operation of the circuit shown in FIG. 2.

DESCRIPTION OF THE PREFERRED EMBODIMENT

FIG. 1A to FIG. 1D show waveform diagrams which are used for explaining the principle of an embodiment of this invention. FIG. 1A shows a leading edge of an input video signal $S_1$ and FIG. 1B shows a differentiated signal $S_2$ of the input signal $S_1$. By inverting a first half portion (illustrated by hatching) of the differentiated signal $S_2$, a correcting signal $S_3$ is obtained, as shown in FIG. 1C. And ideally corrected video signal $S_4$ having a sharp leading edge is obtained by superimposing the correcting signal $S_3$ on the input video signal $S_1$, as shown in FIG. 1D.

An embodiment of the aperture correction circuit according to the invention based upon the above principle will be now described with reference to FIGS. 2 and 3. In FIG. 2, reference numeral 1 indicates an input terminal to which an input signal $S_5$ having dull edges, as shown in FIG. 3A, is applied. A corrected signal which consists of the input signal $S_5$ and a correcting signal superimposed on the former is delivered to an output terminal 2. In this case, the input signal $S_5$ is supplied to a first differentiating circuit consisting of a capacitor 3 and a resistor 4 to be differentiated and then supplied to the base of a transistor 5 to be phase-inverted. Thus, the signal appearing at the collector of the transistor 5 or at a point B is a once-differentiated signal $S_6$ which is phase-inversed as shown in FIG. 3B. The once-differentiated signal $S_6$ is applied to the base of a transistor 6 for phase-splitting. An output signal obtained at the emitter of the transistor 6 is supplied to a second differentiating circuit consisting of a capacitor 7 and a resistor 8 to be differentiated thereby. Thus, an output signal appearing at the ouput terminal of the second differentiating circuit or at a point C is a twice-differentiated signal $S_7$ as shown in FIG. 3C. The ouput signal $S_7$ from the second differentiating circuit is applied to the base of a transistor 9 with an emitter grounded to be phase-inverted and thereafter is applied to a limiter 10 consisting of two diodes connected in parallel with opposite polarities. Accordingly, a pulse signal $S_8$, as shown in FIG. 3D, is obtained at the output terminal of the limiter 10 or at a point D. The pulse signal $S_8$ shown in FIG. 3D is then supplied to the base of a transistor 11 for phase-splitting, so that a switching signal $S_8$ in phase with the pulse signal $S_8$ is obtained at the emitter of the transistor 11 or at a point D' while a switching signal $S_9$ in reverse phase with the switching signal $S_8$, as shown in FIG. 3E, is obtained at the collector of the transistor 11 or at a point E. These switching signals $S_8$ and $S_9$ are supplied to bridge-connected diode switching circuits 12A and 12B, respectively. Generally speaking, the circuit elements 7 through 11 comprise an embodiment of a switch control means responsive to the once-differentiated signal $S_6$ and controlling a switching means, such as bridge rectifiers 12A and 12B, so that the output of the latter corresponds to the differentiated signal with the first half portion of the latter being inverted.

It is assumed that a point of the switching circuit 12A supplied with the switching signal $S_8$ is taken as a first control terminal, $a_1$ and a point thereof supplied with the switching signal $S_9$ is taken as a second control terminal, $b_1$. In the switching circuit 12A a series connection of diodes $D_1$ and $D_2$ and another series connection of diodes $D_3$ and $D_4$, whose forward directions are selected from the point $a_1$ to the point $b_1$, are connected in parallel. In this case, the connection point between the diodes $D_1$ and $D_2$ is made as an input terminal $c_1$ and the connection point between the diodes $D_3$ and $D_4$ is made as an ouput terminal $d_1$. In this switching circuit 12A, resistors are connected in parallel to the diodes $D_1$ to $D_4$, respectively. Similarly, the other switching circuit 12B is formed of diodes $D_5$ to $D_8$ connected in bridge and resistors connected in parallel thereto, respectively. In the switching circuit 12B, a series connection of the diodes $D_6$ and $D_5$ and another series connection of the diodes $D_7$ and $D_8$, which is connected in parallel to the former, are connected in forward direction from a second control terminal, $b_2$, supplied with the switching signal $S_9$ to a first control terminal, $a_2$, supplied with the switching signal $S_8$. The resistors respectively connected in parallel to the diodes $D_1$ to $D_4$ of the switching circuit 12A and the resistors respectively connected in parallel to the diodes $D_5$ to $D_8$ of the switching circuit 12B are selected relatively high in resistance to make their output voltage zero when each of the diodes is non-conductive.

The input terminal $c_1$ of the switching circuit 12A is supplied with a signal $S_{10}$ shown in FIG. 3F which is produced by arranging the once-differentiated signal $S_6$ shown in FIG. 3B in negative polarity, while the input terminal $c_2$ of the switching circuit 12B is supplied with a signal $S_{11}$ shown in FIG. 3G which is produced by arranging the once-differentiated signal $S_6$ shown in FIG. 3B in positive polarity. This function of generating signals $s_{10}$ and $S_{11}$ is accomplished by circuits provided with the once-differentiated signal $S_6$ and described generally as polarity determining means. Thus, the negative portion of the once-differentiated signal appearing at the collector of the transistor 6 (which is in reverse phase with the signal $S_6$ shown in FIG. 3B) and the negative portion of the once-differentiated signal appearing at the emitter of the transistor 6 (which is in phase with the signal $S_6$ shown in FIG. 3B) are transmitted through diodes 13A and 14A to a point F as a signal $S_{10}$ shown in FIG. 3F. At the same time, the positive portion of the once-differentiated signal appearing at the collector of the transistor 6 and the positive portion of the once-differentiated signal appearing at the emitter of the transistor 6 are transmitted through diodes 13B and 14B to a point G as a signal $S_{11}$ shown in FIG. 3G so that first and second signals of opposed respective polarities irrespective of the polarity of the differentiated signal $S_6$ are provided at points F and G. Note that diodes 13A, 14A, 13B and 14B together are arranged as a bridge rectifier. The ouput terminals $d_1$ and $d_2$ of the switching circuits 12A and 12B are connected together through resistors, and then a composite output signal of the switching circuits 12A and 12B is delivered through a capacitor to a point H as a composite signal $S_{12}$ as shown in FIG. 3H. The composite output signal $S_{12}$ delivered to the point H is added through a variable resistor 15 to the input terminal 1.

With the illustrated and described embodiment of the invention, in the time period when the switching signal $S_8$ is positive but the switching signal $S_9$ is negative, the diodes $D_1$ to $D_4$ of the switching circuit 12A are made conductive but the diodes $D_5$ to $D_8$ of the switching circuit 12B are made non-conductive. As a result, in this time period the former half of the signals $S_{10}$ is transmitted to the point H. While in the time period when the switching signal $S_8$ is negative but the switching signal $S_9$ is positive, the diodes $D_1$ to $D_4$ are made non-conductive but the diodes $D_5$ to $D_8$ are made conductive with the result that the latter half portion of the signal $S_{11}$ is transmitted to the point H. When the switching signals $S_8$ and $S_9$ are both zero, the diodes $D_1$ to $D_4$ and the diodes $D_5$ to $D_6$ are made non-conductive and hence the level at the point H is also zero.

Next, when the switching signal $S_8$ becomes negative and the switching signal $S_9$ becomes positive, the diodes $D_1$ to $D_4$ become non-conductive and the diodes $D_5$ to $D_8$ become conductive. When the polarities of the switching signals $S_8$ and $S_9$ are reversed, the diodes $D_1$ to $D_4$ become conductive but the diodes $D_5$ to $D_8$ become non-conductive. Consequently, switching means 12A and 12B operate to alternately conduct the signals of first and second opposed polarities provided by the polarity determining means and, as a result, the correcting signal $S_{12}$ shown in FIG. 3H corresponding to the differentiated signal with the first half portion of the latter being inverted is obtained at the point H. This signal is added to the input signal $S_5$ shown in FIG. 3A from the input terminal 1. Therefore, at the output terminal 2 there is obtained an ideal rectangular shaped signal $S_{13}$ which has a substantially vertical rising up portion and sharp edges, as shown in FIG. 3I.

Generally, speaking, the above described polarity determining means, switching means and switch control means respond to the differentiated input signal and cooperate to provide at the output of the switching means a correcting signal $S_3$ as illustrated in FIG. 1C. Collectively, these three elements correspond to the waveform shaping circuit.

As may be obvious from the above description, according to the present invention, a video signal, whose rising up portion is not vertical but inclined from the vertical and whose edges are dull, can be made to be an ideal one whose rising up portion is substantially vertical and whose edges are sharpened.

Accordingly, if the present invention is inserted into, for example, the luminance signal and chrominance signal sytems, the sharpness of a picture and the contour of its color can be made clear.

The foregoing description is given for only one preferred embodiment of the present invention, but it may be apparent that many modifications and variations could be effected by one skilled in the art without departing from the spirits or scope of the novel concepts of the present invention.

I claim as my invention:
1. An aperture correction circuit comprising:
    A. a differentiating circuit for differentiating an input signal;
    B. polarity determining means for separating the differentiated signal into corresponding first and second signals of opposed respective polarities said first signal consisting of:
        1. those portions of said differentiated signal produced when the differential of said input signal is positive and inverted reproductions of those portions of said differentiated signal produced when the differential of said input signal is negative, and
        2. said second signal consisting of those portions of said differentiated signal produced when the differential of said input signal is negative and inverted reproductions of those portions of said differentiated signal produced when the differential of said input signal is positive;

C. switching means operative to alternately conduct selected intervals of said first and second signals;

D. switch control means responsive to said differentiated signal to control said switching means so that the ouput signal of the latter corresponds to said second signal during those intervals when the second differential of said input signal is positive and corresponds to said first signal during those intervals when the second differential of said input signal is negative; and E. an adding circuit which adds said output signal of the switching means to said input signal for obtaining an aperture corrected signal from said adding circuit.

2. An aperture correction circuit according to claim 1, wherein said switching means comprises first and second rectifying bridge means alternately rendered conductive by said switch control means.

3. An aperture correction circuit according to claim 1, wherein said polarity determining means comprises a phase splitter receiving said differentiated signal and yielding signals which are respectively in phase with said differentiated signal and 180° out of phase in respect to the latter, and means having first and second output terminals for conducting oppositely polarized portions of said signals yielded by the phase splitter to said first and second output terminals, respectively, to there provide said first and second signals of opposed respective polarities.

4. An aperture correction circuit according to claim 3, wherein said means for conducting oppositely polarized portions of said signals yielded by the phase splitter to said first and second output terminals comprises a bridge rectifier having said first and second output terminals at opposed locations, and first and second input terminals at opposed locations on said bridge rectifier and respectively receiving said signals which are in phase with said differentiated signal and 180° out of phase in respect to the latter, so that during such periods that a signal received at either of said input terminals is of a first polarity, it is conducted to said first output terminal, and during such periods that a signal received at either of said input terminals is of a second polarity, it is conducted to said second output terminal.

5. An aperture correction circuit according to claim 1, wherein said switch control means comprises an additional differentiating circuit for yielding a twice differentiated signal, a limiter for limiting said twice differentiated signal and a phase splitter receiving the limited twice differentiated signal and yielding first and second control signals which are respectively in phase, and 180° out of phase in respect to the limited twice differentiated signal for application to said switching means so as to render the latter operative to alternately conduct said signals of first and second opposed polarities.

6. An aperture correction circuit according to claim 5, wherein said switching means comprise first and second rectifying bridge means, each of said rectifying bridge means having an input terminal, an output terminal opposite said input terminal, and first and second control terminals at opposed locations on said rectifying bridge means, said input terminals respectively receiving said first and second signals of opposed respective polarities, said first control signal being applied to the first control terminal of each of said rectifying bridge means, said second control signal being applied to the second control terminal of each of said rectifying bridge means, so that when said first control signal is in a first opposed polarity with respect to said second control signal, the first rectifying bridge means conducts said first signal of opposed respective polarity to its output terminal for application to said adding circuit, and when said first control signal is in a second opposed polarity with respect to said second control signal, the second rectifying bridge means conducts said second signal of opposed respective polarity to its output terminal for application to said adding circuit.

* * * * *